Dec. 3, 1935.  M. M. CLAYTON  2,023,004
ELECTRICAL WIRING SYSTEM
Filed March 8, 1932    2 Sheets-Sheet 1

Martin M. Clayton
INVENTOR
BY
Cooper, Kerr & Dunham
ATTORNEYS

Dec. 3, 1935. M. M. CLAYTON 2,023,004
ELECTRICAL WIRING SYSTEM
Filed March 8, 1932 2 Sheets-Sheet 2
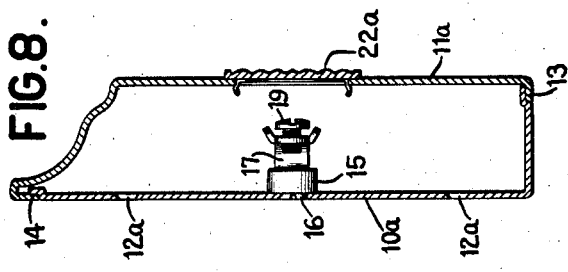
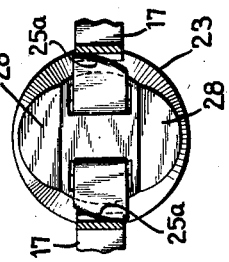
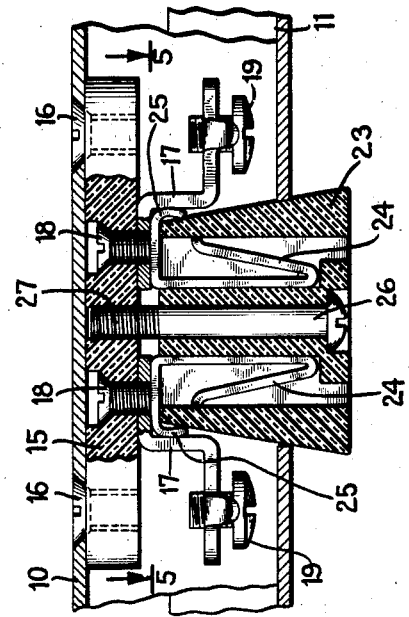
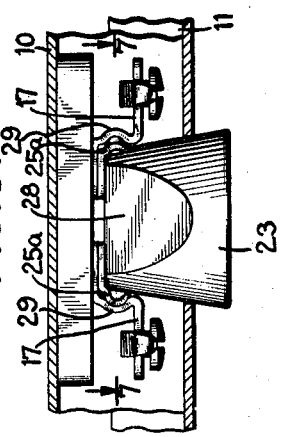
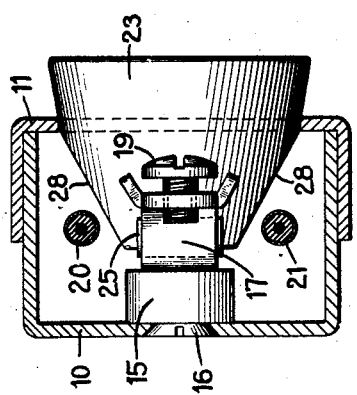
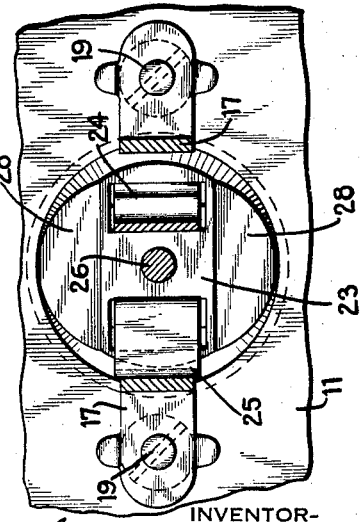
INVENTOR-
Martin M. Clayton
BY
Cooper, Kerr & Dunham
ATTORNEYS Patented Dec. 3, 1935

2,023,004

UNITED STATES PATENT OFFICE 2,023,004

ELECTRICAL WIRING SYSTEM

Martin M. Clayton, Baden, Pa., assignor to National Electric Products Corporation, New York, N. Y., a corporation of Delaware Application March 8, 1932, Serial No. 597,480

4 Claims. (Cl. 247—28)

This invention relates to improvements in electrical wiring systems and more particularly to an improved system with a raceway which will provide for additional outlets as occasion arises and which will also provide for the disposition of outlets at another location along the raceway.

More particularly, the system is of the type in which the raceway is installed in or upon the side walls in the interior of buildings. In the ordinary electrical wiring practice it is customary to provide outlets at definite predetermined locations. These predetermined outlets are wired with loom, cable, conduit or other standard materials. When such outlets are not located suitably for lamps, appliances, etc., it is the customary practice to use long cords to reach the outlets. The use of long cords is not only dangerous but is also unsightly and is otherwise undesirable. In other instances, additional base outlets are installed. The installation of these outlets is comparatively expensive and consequently such additional outlets are seldom employed. Various systems and miscellaneous materials have been developed to provide additional outlets, but all of these present objectionable features. One practice is to provide wire assemblies attached to or disposed above the base board which feed from an existing outlet to an additional one at the desired location. Such a system is unsightly and encourages the unintentional overloading of circuits.

Another system comprises a raceway containing two continuous contact strips with the raceway provided with either continuous slots or pairs of slots at frequent intervals for the reception of prong plugs. With such a system the raceway must either be made of insulating material or in the event that the raceway is of metal such raceway must be lined with insulating material. With such a system the cost of the contact strips is high as compared with ordinary wire, and the cost of the insulating material lining or insulating material raceway is relatively high so that accordingly, the total cost of such a system is practically prohibitive. With such a system it is also difficult to separately switch any of the outlets.

Another system comprises a raceway in which complete outlets are initially installed at relatively close intervals so that the user may select an outlet at any point where desired. This type of system provides for more outlets than will ever be needed and accordingly the initial expense is relatively high on account of the cost of the excess of outlets which are needed in order to secure flexibility.

The present invention has for its object the provision of a wiring system which will obviate the foregoing disadvantages of existing systems.

One object of the present invention is to provide a pre-wired raceway of a type which will permit the addition of outlets without adding any wiring at the time additional outlets are installed.

Another object of the present invention is to provide a pre-wired raceway in which outlet locations may be changed at will without the necessity of wiring such outlets when changes of location are made.

Another object of the present invention is to provide a raceway of the type above set forth which is easily wired and inexpensive to manufacture.

Another object of the present invention is to provide an improved form of outlet which may be inserted in and secured in a raceway and automatically make electrical connection to the conductors in said raceway.

Another object of the present invention is to provide an outlet of a type which may be easily removed and inserted in another location along the raceway.

Further and other objects of the present invention will be hereinafter set forth in the accompanying specification and claims and shown in the drawings, which by way of illustration show what I now consider to be a preferred embodiment of the invention.

In the drawings:

Fig. 3 is a detail transverse sectional view taken substantially on line 3—3 of Fig. 2 and looking in the direction of the arrows;

Fig. 4 is a detail transverse sectional view of one of the terminal devices with an outlet or receptacle installed therein, the section being taken substantially on line 4—4 of Fig. 2;

Fig. 5 is a detail sectional view taken substantially on line 5—5 of Fig. 4;

Fig. 6 is a view similar to Fig. 4 but with a slightly modified form of terminal device. This view also shows the exterior of the outlet device instead of a central section of the same as shown in Fig. 4;

Fig. 7 shows an outlet or receptacle element with a modified configuration of the contacts; and Fig. 8 shows a modified configuration of the raceway. This raceway is intended for use as a base board.

Figure 1:
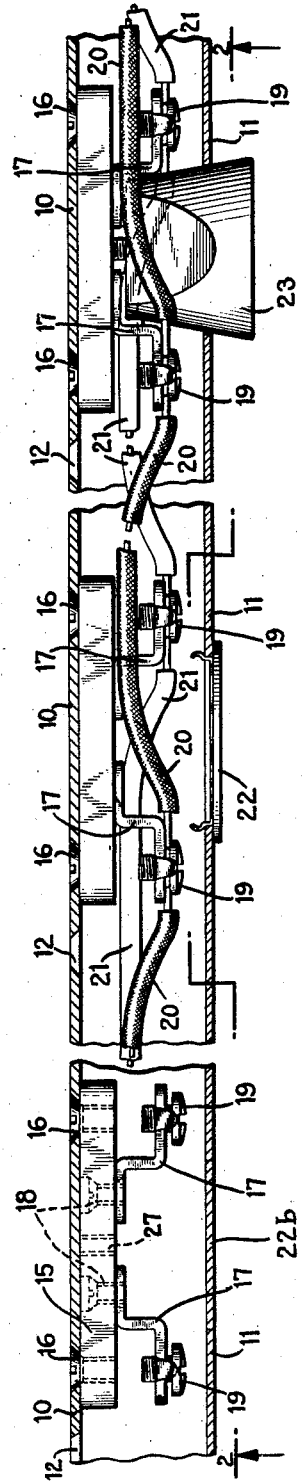
Figure 1 is a sectional view of a raceway showing at one portion of the raceway an unwired receptacle and at another portion a wired receptacle and at another portion an outlet cooperating with the wired receptacle.

In more detail in the drawings, the raceway preferably is made of metal comprising a base portion 10 and a cap or cover portion 11. The base portion 10 may be provided with screw holes such as 12 at intervals therealong to permit the attaching of the raceway to a wall or other surface by screws which pass through these holes 12.

In the modified form of raceway shown in Fig. 8, the base portion 10a is of slightly different configuration and the cover 11a is also slightly differently shaped so that when the cover 11a is assembled to the base 10a, the complete raceway is in the form of a base board with the cover locking to the base at points 13 and 14. With this form of raceway holes 12a are likewise provided in the base portion 10a, through which screws may be passed to secure the raceway to a wall or other surface.

Disposed at relatively close intervals along and within the raceway are terminal blocks which will now be described. Each terminal block comprises a body portion 15 which is preferably made of fibre or other insulating material. Such terminal block is preferably secured to the base portion 10 by fastening means such as screws 16 which preferably pass through countersunk holes in the base portion 10. If desired the terminal blocks may be riveted to the body portion of the raceway. Each terminal member or block is provided with terminals generally designated 17, the terminals being fastened to the terminal block body by means of screws 18. Each of the terminals is provided with a suitable binding screw 19 to which a conductor may be fastened. Preferably the terminal blocks 15 are secured to the base portion 10 of the raceway at rather close spacing. Preferably such spacing of the terminals may be from two to five feet and preferably but not necessarily spacing from terminal to terminal should be uniform.

Figure 2:
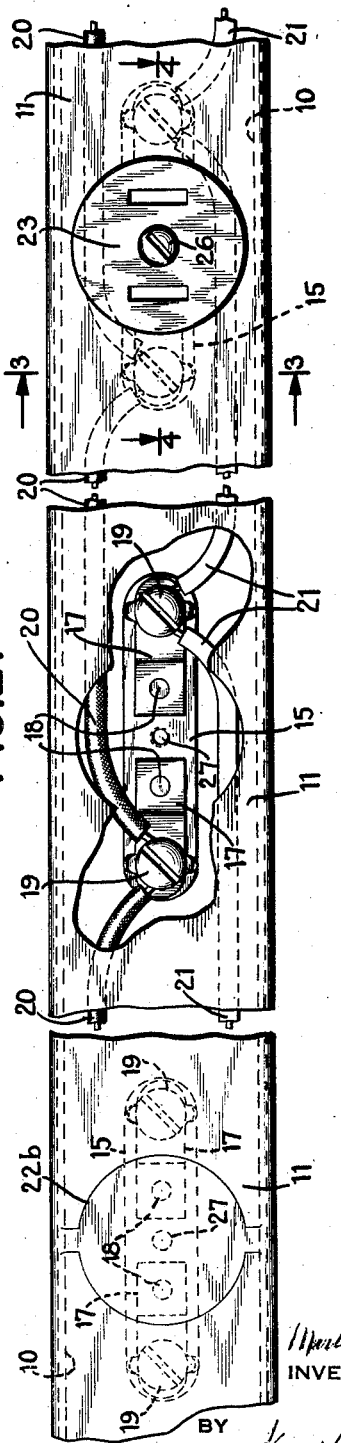
Fig. 2 is a front elevational view, the view being taken substantially on line 2—2 of Fig. 1 and looking in the direction of the arrows.

After the terminal blocks are installed in the base portion of the raceway these terminal blocks are wired up. Preferably a system of looped wiring is employed. As shown in Fig. 2 a black wire 20 is loop wired to the left screw 19 of each terminal block and a white wire 21 is loop wired to each right hand screw. This is the preferred method of wiring up the raceway but other methods of wiring may be employed as may be deemed expedient.

Referring now to the cover portion 11 of the raceway, this cover portion at intervals therealong which corresponds to the spacing of the terminal blocks is provided with openings therealong. Such openings may be blinded off by a blank disk such as 22 in Fig. 1 or an ornamental or medallion blanking off disks 22a may be employed (see Fig. 8) or knockout members 22b of conventional form may be used (see Figs. 1 and 2). Such knockouts 22b may be of ordinary form with a single intact portion or with multiple intact portions as shown in Fig. 2.

After the raceway has been installed and wired as above described and when an outlet is desired at any point along the raceway the blinder or knockout may be removed and the outlet or receptacle generally designated at 23 in Fig. 1, installed in the raceway.

One embodiment of outlet or receptacle comprises a somewhat tapering body portion of insulating material. This body portion is provided with plug contacts 24 (see Fig. 4), continuous portions 25 of these plug contacts being provided which extend into and resiliently contact with the terminal contact members 17 as shown when the body portion is inserted through the hole or opening in the raceway cover. Each receptacle is also preferably provided with a screw 26 which extends through the block and which is adapted to be threaded into a threaded opening 27 in the body portion of the associated terminal block. With the receptacle thus installed any given outlet is ready for use and ready to receive the usual attachment plug.

Preferably to give the maximum clearance for the wires 20 and 21, each receptacle is bevelled off as indicated at 28, Figs. 3 and 6. It will be understood that the clearance would be minimized if a simple frusto-conical configuration was employed for the receptacle.

Modified configurations of the terminal elements 17 may be employed if desired. In Fig. 6 the terminal elements 17 are shown with an intermediate curved recessed portion 29 to provide for the reception of the contacting extensions 25.

According to the embodiment shown in Fig. 7, the compressible portions of the plug contacts are spiralled from the body as indicated at 25a. When this type of receptacle is pressed into the terminal block, which preferably has the configuration shown in Fig. 6, the parts 25a are rotated and compressed into the recesses 29 of the terminal block, thus not only making a good electrical contact, but holding the receptacle against removal by an outward pull. With this construction the screw 26 shown in Fig. 4 need not be used.

Summarizing the manner of use of the improved wiring system is as follows: The base of the raceway 10 is furnished with terminal blocks 15 mounted at defined intervals therealong and the base is secured to the wall or surface and wired up with the wires which loop to the terminals in the manner shown in Figs. 1 and 2. The cap portion 11 is then placed in position with the opening locations directly above the terminal blocks. Receptacles or outlets may then be inserted where desired by removing the covers from the openings and inserting the receptacles in such openings. The outlet receptacles are then ready for use.

If it becomes desirable to change the location of the receptacle or outlet it may be readily removed from one position and placed in another terminal block and the blinder which was removed from the new location may be used to close up the opening at the old location. Additional outlets may be provided by using extra receptacles and inserting them at desired locations.

The raceway is completely wired upon initial installation and accordingly, additional outlets may be installed without additional wiring.

While preferred embodiments of terminal blocks have been shown, it is obvious that various other constructions are possible, all within the scope of the present invention. Likewise different configurations of raceways may be employed.

Furthermore, while I have shown a plug form of outlet receptacle in the drawings and description, sockets, switches and other equivalent outlet receptacles or outlet devices can be employed in a similar manner.

What I claim is:

1. An electrical wiring system including a raceway with a back portion and a front portion, terminal devices secured at intervals along and within the raceway to the back portion thereof, each of said terminal devices comprising a mounting block and contact devices thereon adapted to removably receive an outlet receptacle device substantially enclosed within the raceway, wiring in the raceway connected to said contact devices, openings in the front portion of the raceway opposite each of the terminal devices, and replaceable outlet receptacle devices selectively insertible through any one or more of said openings and having contact portions for cooperation with the contact devices of the terminal devices upon insertion.

2. An electrical wiring system comprising a wire raceway having a bottom portion and having mounted on said bottom portion receptacle-receiving contact devices adapted to receive removable receptacle devices having contacts cooperating with the contacts on the receiving devices when the receptacle devices are placed in position, said raceway being constructed to substantially enclose the receptacle devices when the latter are placed in position.

3. An electrical wiring system according to claim 2, in which the wire raceway has a cover portion provided with openings therealong for insertion of receptacle devices, each opening being disposed opposite a receptacle receiving contact device, and in which removable means is provided for closing off unused openings and for permitting the opening up of any desired opening.

4. An electrical wiring system comprising a wire raceway, terminal devices therein having contact portions, and removable outlet receptacle devices having contact portions for cooperation with the contact portions of the terminal devices, said raceway being adapted to substantially enclose the receptacle devices when the latter are inserted therein and in contact-cooperating relation with the terminal devices.

MARTIN M. CLAYTON.